United States Patent
Zheng

(10) Patent No.: US 11,178,073 B2
(45) Date of Patent: Nov. 16, 2021

(54) MESSAGE TRANSMISSION METHOD, ACCESS NODE, ACCESS CONTROLLER, AND ACCESS SYSTEM

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 15/873,507

(22) Filed: Jan. 17, 2018

(65) Prior Publication Data
US 2018/0145931 A1 May 24, 2018

Related U.S. Application Data

(63) Continuation of application No. PCT/CN2016/085990, filed on Jun. 16, 2016.

(30) Foreign Application Priority Data

| Jul. 17, 2015 | (CN) | 201510424501.7 |
| Mar. 31, 2016 | (CN) | 201610201117.5 |

(51) Int. Cl.
*H04L 12/28* (2006.01)
*H04L 12/947* (2013.01)
(Continued)

(52) U.S. Cl.
CPC ............ *H04L 49/252* (2013.01); *H04L 45/50* (2013.01); *H04L 45/64* (2013.01); *H04L 45/74* (2013.01);
(Continued)

(58) Field of Classification Search
CPC ....... H04L 45/74; H04L 69/22; H04L 45/745; H04L 12/4633; H04L 12/4641; H04L 45/7453; H04L 45/38
See application file for complete search history.

(56) References Cited

U.S. PATENT DOCUMENTS

| 2003/0039240 | A1* | 2/2003 | Sutanto | H04L 12/2801 370/352 |
| 2004/0123329 | A1* | 6/2004 | Williams | H04L 61/2046 725/111 |

(Continued)

FOREIGN PATENT DOCUMENTS

| CN | 101123549 A | 2/2008 |
| CN | 101188614 A | 5/2008 |

(Continued)

OTHER PUBLICATIONS

Authentication processing method and device CN103546286 (A)—Jan. 29, 2014 (Year: 2014).*
(Continued)

*Primary Examiner* — Atique Ahmed
(74) *Attorney, Agent, or Firm* — Conley Rose, P.C.

(57) ABSTRACT

A message transmission method, an access node, an access controller, and an access system, where in the method, a message is processed by an access controller instead of an access node such that the access node does not need to support a relay function, reducing operation and maintenance difficulties and costs. In the method, the access controller receives a first message from the access node, and the first message includes a first identifier. The access controller obtains a line identifier according to the first identifier. The access controller obtains a second message according to the line identifier, and the second message
(Continued)

includes the line identifier. The access controller sends the second message to a relay server.

28 Claims, 10 Drawing Sheets

(51) Int. Cl.
    *H04L 12/723*     (2013.01)
    *H04L 29/08*     (2006.01)
    *H04L 12/715*     (2013.01)
    *H04L 12/741*     (2013.01)
    *H04L 29/12*     (2006.01)
    *H04L 29/06*     (2006.01)

(52) U.S. Cl.
    CPC ...... *H04L 61/2015* (2013.01); *H04L 67/1095* (2013.01); *H04L 63/0892* (2013.01)

(56) References Cited

U.S. PATENT DOCUMENTS

| | | | |
|---|---|---|---|
| 2005/0122991 A1* | 6/2005 | Golasky | H04L 29/06 370/467 |
| 2005/0216769 A1 | 9/2005 | Matsuoka et al. | |
| 2006/0155984 A1* | 7/2006 | Tsuchida | H04L 12/2803 713/156 |
| 2006/0280179 A1* | 12/2006 | Meier | H04L 61/2023 370/389 |
| 2008/0075080 A1* | 3/2008 | Katabi | H04L 1/1671 370/392 |
| 2009/0061869 A1* | 3/2009 | Bui | H04L 61/2015 455/435.1 |
| 2009/0144442 A1 | 6/2009 | Zheng et al. | |
| 2010/0107231 A1* | 4/2010 | Kavanagh | H04L 9/3213 726/7 |
| 2011/0002342 A1* | 1/2011 | Zheng | H04L 63/0892 370/401 |
| 2011/0178651 A1* | 7/2011 | Choi | H04Q 9/00 700/295 |
| 2012/0236864 A1 | 9/2012 | Zheng et al. | |
| 2012/0246221 A1* | 9/2012 | Miyawaki | H04L 63/101 709/203 |
| 2013/0041963 A1* | 2/2013 | Cho | H04W 4/02 709/206 |
| 2013/0250947 A1* | 9/2013 | Zheng | H04L 45/02 370/389 |
| 2014/0143428 A1* | 5/2014 | Zheng | H04L 65/1036 709/226 |
| 2015/0043588 A1* | 2/2015 | Kato | H04L 45/64 370/392 |
| 2015/0188812 A1 | 7/2015 | Zheng | |
| 2015/0236912 A1 | 8/2015 | Zhang | |
| 2016/0261556 A1 | 9/2016 | Zheng | |

FOREIGN PATENT DOCUMENTS

| | | |
|---|---|---|
| CN | 101212398 A | 7/2008 |
| CN | 101257420 A | 9/2008 |
| CN | 103546286 A | 1/2014 |
| CN | 103686466 A | 3/2014 |
| CN | 103813336 A | 5/2014 |
| CN | 104639413 A | 5/2015 |

OTHER PUBLICATIONS

Foreign Communication From a Counterpart Application, Chinese Application No. 201610201117.5, Chinese Search Report dated Feb. 21, 2019, 3 pages.
Foreign Communication From a Counterpart Application, Chinese Application No. 201610201117.5, Chinese Office Action dated Mar. 1, 2019, 8 pages.
Foreign Communication From a Counterpart Application, European Application No. 16827134.4, Extended European Search Report dated Jul. 3, 2018, 7 pages.
Machine Translation and Abstract of Chinese Publication No. CN101188614, May 28, 2008, 28 pages.
Machine Translation and Abstract of Chinese Publication No. CN101212398, Jul. 2, 2008, 21 pages.
Machine Translation and Abstract of Chinese Publication No. CN101257420, Sep. 3, 2008, 14 pages.
Machine Translation and Abstract of Chinese Publication No. CN103546286, Jan. 29, 2014, 28 pages.
"Migration to Ethernet-Based DSL Aggregation," Technical Report, DSL Forum TR-101, Apr. 2006, 101 pages.
"Migration to Ethernet-Based Broadband Aggregation," TR-101 Issue: 2, Technical Report, Jul. 2011, 101 pages.
"Using GPON Access in the context of TR-101," TR-156, Issue: 1, Technical Report, Dec. 2008, 50 pages.
"GPON-fed TR-101 Ethernet Access Node," TR-167, Issue: 1, Technical Report, Feb. 2010, 30 pages.
"Multi-service Broadband Network Architecture and Nodal Requirements," TR-178, Issue: 1, Technical Report, Sep. 2014, 97 pages.
"Architecture and Requirements for Fiber to the Distribution Point," TR-301, Issue: 1, Technical Report, Aug. 2015, 55 pages.
Foreign Communication From a Counterpart Application, PCT Application No. PCT/CN2016/085990, English Translation of International Search Report dated Aug. 31, 2016, 2 pages.
Foreign Communication From a Counterpart Application, PCT Application No. PCT/CN2016/085990, English Translation of Written Opinion dated Aug. 31, 2016, 6 pages.
WT-358, "Requirements for Support of SDN in Access Nodes," Revision: 01, Revision Date: Jul. 2015, 12 pages.

\* cited by examiner

MESSAGE TRANSMISSION METHOD, ACCESS NODE, ACCESS CONTROLLER, AND ACCESS SYSTEM

CROSS-REFERENCE TO RELATED APPLICATIONS

This application is a continuation of International Patent Application No. PCT/CN2016/085990 filed on Jun. 16, 2016, which claims priority to Chinese Patent Application No. 201610201117.5 filed on Mar. 31, 2016, and Chinese Patent Application No. 201510424501.7 filed on Jul. 17, 2015. All of the aforementioned patent applications are hereby incorporated by reference in their entireties.

TECHNICAL FIELD

Embodiments of the present disclosure relate to communications technologies, and in particular, to a message transmission method, an access node, an access controller, and an access system.

BACKGROUND

Currently, in an access network architecture, a message is transmitted between a client device and a relay server using a message transmission path. The message may be a Dynamic Host Configuration Protocol (DHCP) message, a router solicitation (RS) message, a router advertisement (RA) message, or the like. In a message transmission process, each access node on the message transmission path needs to support a relay function. That is, a control plane of each access node on the message transmission path needs to be configured to implement the relay function. When new services emerge continuously, the control plane of each access node needs to be configured for each added service, resulting in relatively high operation and maintenance costs and complexity.

SUMMARY

Embodiments of the present disclosure provide a message transmission method, an access node, an access controller, and an access system to help reduce operation and maintenance costs and complexity.

According to a first aspect, a message transmission method is provided. The method includes receiving, by an access controller, a first message sent by an access node, where the first message includes a first identifier, obtaining, by the access controller, a line identifier according to the first identifier, obtaining, by the access controller, a second message according to the line identifier, where the second message includes the line identifier, and sending, by the access controller, the second message to a relay server.

In the message transmission method provided in this embodiment of the present disclosure, the access controller obtains, according to the first message received from the access node, the second message including the line identifier. The access node does not need to insert a line identifier into a message that is from a user. In this way, a control plane of the access node may be moved to the access controller. Therefore, the control plane of the access node is separated from the access node. For example, the access node does not need to support a relay function. This helps reduce operation and maintenance costs and complexity.

The first message and the second message may be control plane messages. The first message may be an OpenFlow message, or the first message is a tunnel packet.

Optionally, obtaining, by the access controller, a line identifier according to the first identifier includes obtaining, by the access controller, the line identifier according to the first identifier and a correspondence, where the correspondence includes a correspondence between the first identifier and the line identifier.

Optionally, obtaining, by the access controller, a line identifier according to the first identifier includes encoding, by the access controller, the first identifier according to a first encoding rule to obtain the line identifier.

The first encoding rule may be an encoding method for encoding the first identifier into the line identifier, or the first encoding rule may be an index value that corresponds to an encoding method for encoding the first identifier into the line identifier.

Optionally, the first message further includes a first DHCP message, the second message is a second DHCP message, and obtaining, by the access controller, a second message according to the line identifier includes adding, by the access controller, the line identifier to the first DHCP message to obtain the second DHCP message, where the second DHCP message includes the line identifier.

Optionally, the first message further includes an RS message, the second message is a first authentication, authorization, and accounting (AAA) message, and obtaining, by the access controller, a second message according to the line identifier includes generating, by the access controller, the first AAA message according to the line identifier and the RS message, where the first AAA message includes the line identifier.

Optionally, the method further includes receiving, by the access controller, a fourth message sent by the relay server, where the fourth message includes the line identifier and Internet Protocol (IP) address information, and the IP address information is an IP address or an IP address prefix, obtaining, by the access controller, the first identifier according to the line identifier, obtaining, by the access controller, a third message according to the first identifier, where the third message includes the first identifier and the IP address information, and sending, by the access controller, the third message to the access node.

The first message and the second message are control plane messages. The second message may be an OpenFlow message, or the second message may be a tunnel packet. The relay server may be a device for assigning IP address information to the user, for example, an AAA server or a DHCP server that can assign IP address information.

Optionally, obtaining, by the access controller, the first identifier according to the line identifier includes obtaining, by the access controller, the first identifier according to the line identifier and a correspondence, where the correspondence includes the correspondence between the first identifier and the line identifier.

Optionally, obtaining, by the access controller, the first identifier according to the line identifier includes encoding, by the access controller, the line identifier according to a second encoding rule to obtain the first identifier.

The second encoding rule may be an encoding method for encoding the line identifier into the first identifier, or the second encoding rule may be an index value that corresponds to an encoding method for encoding the line identifier into the first identifier.

Optionally, the fourth message is a third DHCP message, and obtaining, by the access controller, a third message according to the first identifier includes deleting, by the access controller, the line identifier included in the third DHCP message to obtain a fourth DHCP message, where the fourth DHCP message includes the IP address information, and obtaining, by the access controller, the third message according to the first identifier and the fourth DHCP message, where the third message further includes the fourth DHCP message.

Optionally, the fourth message is a second AAA message, and obtaining, by the access controller, a third message according to the first identifier includes obtaining, by the access controller, an RA message according to the second AAA message and the IP address information, where the RA message includes the IP address information, and obtaining, by the access controller, the third message according to the first identifier and the RA message, where the third message further includes the RA message.

Optionally, the first identifier includes a physical port number, and the line identifier includes at least one of a rack number, a frame number, a slot number, or a physical port number of the access node. The physical port number may be used to identify a physical port that is on the access node and that is used for communication with the user.

Optionally, the first identifier includes a tunnel identifier and/or a logical port number, and the line identifier includes at least one of a virtual local area network (VLAN) identifier (VID), a virtual path identifier (VPI), or a virtual channel identifier (VCI) of the access node.

Optionally, the first identifier includes a Media Access Control (MAC) address or an IP address of the access node, and the line identifier includes at least one of an identity or a chassis number of the access node.

Optionally, the first identifier includes a tunnel identifier. The tunnel identifier is used to identify a tunnel between the access node and the access controller. The line identifier includes at least one of a rack number, a frame number, a slot number, a physical port number, a VID, a VPI, a VCI, or an identity of the access node.

The VPI may be used to identify a virtual path that is on the access node and that is used for communication with the user. The VCI may be used to identify a virtual channel that is on the access node and that is used for communication with the user.

According to a second aspect, a message transmission method is provided. The method includes receiving, by an access node, a second message sent by a user, obtaining, by the access node, a line identifier according to the second message, where the second message includes the line identifier, obtaining, by the access node, a first identifier according to the line identifier, obtaining, by the access node, a first message according to the first identifier and the second message, where the first message includes the first identifier and the second message, and sending, by the access node, the first message to an access controller.

In the method provided in this embodiment of the present disclosure, the access node may add the first identifier that corresponds to the line identifier to the first message sent to the access controller. Therefore, a control plane of the access node is moved to the access controller, helping reduce operation and maintenance costs and complexity of the access node.

Optionally, obtaining, by the access node, a first identifier according to the line identifier includes obtaining, by the access node, the first identifier according to the line identifier and a correspondence, where the correspondence includes a correspondence between the line identifier and the first identifier.

Optionally, obtaining, by the access node, a first identifier according to the line identifier includes encoding, by the access node, the line identifier according to a first encoding rule to obtain the first identifier.

Optionally, the method further includes receiving, by the access node, a third message sent by the access controller, where the third message includes IP address information, the first identifier, and a fourth message, the IP address information is an IP address or an IP address prefix, and the fourth message includes the IP address information, obtaining, by the access node, the line identifier according to the first identifier, and sending, by the access node, the fourth message to the user according to the line identifier.

Optionally, obtaining, by the access node, the line identifier according to the first identifier includes obtaining, by the access node, the line identifier according to the first identifier and the correspondence, where the correspondence includes the correspondence between the first identifier and the line identifier.

Optionally, obtaining, by the access node, the line identifier according to the first identifier includes encoding, by the access node, the first identifier according to a second encoding rule to obtain the line identifier.

In the method provided according to the second aspect, the first identifier may be the same as the first identifier provided according to the first aspect, and the line identifier may be the same as the line identifier provided according to the first aspect.

According to a third aspect, an access controller is provided. The access controller includes a first receiving module configured to receive a first message sent by an access node, where the first message includes a first identifier, a first obtaining module configured to obtain a line identifier according to the first identifier, a second obtaining module configured to obtain a second message according to the line identifier, where the second message includes the line identifier, and a first sending module configured to send the second message to a relay server.

The access controller provided according to the third aspect may perform the method provided according to any one of the first aspect or the possible implementations of the first aspect. The access controller provided according to the third aspect may be the access controller in the method provided according to any one of the second aspect or the possible implementations of the second aspect.

Optionally, the first obtaining module is further configured to obtain the line identifier according to the first identifier and a correspondence, where the correspondence includes a correspondence between the first identifier and the line identifier.

Optionally, the first obtaining module is further configured to encode the first identifier according to a first encoding rule to obtain the line identifier.

Optionally, the first message further includes a first DHCP message, the second message is a second DHCP message, and the second obtaining module is further configured to add the line identifier to the first DHCP message to obtain the second DHCP message, where the second DHCP message includes the line identifier.

Optionally, the first message further includes an RS message or a DHCP message, the second message is a first AAA message, and the second obtaining module is further configured to generate the first AAA message according to the line identifier and the RS message, where the first AAA message includes the line identifier.

Optionally, the access controller further includes a second receiving module configured to receive a fourth message sent by the relay server, where the fourth message includes the line identifier and IP address information, and the IP address information is an IP address or an IP address prefix, a third obtaining module configured to obtain the first identifier according to the line identifier, a fourth obtaining module configured to obtain a third message according to the first identifier, where the third message includes the first identifier and the IP address information, and a second sending module configured to send the third message to the access node.

Optionally, the third obtaining module is further configured to obtain the first identifier according to the line identifier and a correspondence, where the correspondence includes the correspondence between the first identifier and the line identifier.

Optionally, the third obtaining module is further configured to encode the line identifier according to a second encoding rule to obtain the first identifier.

Optionally, the fourth message is a third DHCP message, and the fourth obtaining module is further configured to delete the line identifier included in the third DHCP message to obtain a fourth DHCP message, where the fourth DHCP message includes the IP address information, and obtain the third message according to the first identifier and the fourth DHCP message, where the third message further includes the fourth DHCP message.

Optionally, the fourth message is a second AAA message, and the fourth obtaining module is further configured to obtain an RA message according to the second AAA message and the IP address information, where the RA message includes the IP address information, and obtain the third message according to the first identifier and the RA message, where the third message further includes the RA message.

In the method provided according to the third aspect, the first identifier may be the same as the first identifier provided according to the first aspect, and the line identifier may be the same as the line identifier provided according to the first aspect.

According to a fourth aspect, an access apparatus is provided. The access apparatus includes a first receiving module configured to receive a second message sent by a user, a first obtaining module configured to obtain a line identifier according to the second message, where the second message includes the line identifier, a second obtaining module configured to obtain a first identifier according to the line identifier, a third obtaining module configured to obtain a first message according to the first identifier and the second message, where the first message includes the first identifier and the second message, and a first sending module configured to send the first message to an access controller.

The access apparatus provided according to the fourth aspect may perform the method provided according to any one of the second aspect or the possible implementations of the second aspect. The access apparatus provided according to the fourth aspect may be the access node in any one of the foregoing possible implementations.

Optionally, the second obtaining module is further configured to obtain the first identifier according to the line identifier and a correspondence, where the correspondence includes a correspondence between the line identifier and the first identifier.

Optionally, the second obtaining module is further configured to encode the line identifier according to a first encoding rule to obtain the first identifier.

Optionally, the access apparatus further includes a second receiving module configured to receive a third message sent by the access controller, where the third message includes IP address information, the first identifier, and a fourth message, the IP address information is an IP address or an IP address prefix, and the fourth message includes the IP address information, a fourth obtaining module configured to obtain the line identifier according to the first identifier, and a second sending module configured to send the fourth message to the user according to the line identifier.

Optionally, the fourth obtaining module is further configured to obtain the line identifier according to the first identifier and the correspondence, where the correspondence includes the correspondence between the first identifier and the line identifier.

Optionally, the fourth obtaining module is further configured to encode the first identifier according to a second encoding rule to obtain the line identifier.

In the method provided according to the fourth aspect, the first identifier may be the same as the first identifier provided according to the first aspect, and the line identifier may be the same as the line identifier provided according to the first aspect.

According to a fifth aspect, an access controller is provided. The access controller includes a communications interface, a processor, and a memory configured to store a program. The processor reads the program in the memory, and performs, according to an instruction corresponding to the program, the operations of receiving, using the communications interface, a first message sent by an access node, where the first message includes a first identifier, obtaining a line identifier according to the first identifier, obtaining a second message according to the line identifier, where the second message includes the line identifier, and sending the second message to a relay server using the communications interface.

Optionally, the processor included in the access controller may further perform the method provided according to any one of the first aspect or the possible implementations of the first aspect.

According to a sixth aspect, an access apparatus is provided. The access apparatus includes a communications interface, a processor, and a memory configured to store a program. The processor reads the program in the memory, and performs, according to an instruction corresponding to the program, the operations of receiving, using the communications interface, a second message sent by a user, obtaining a line identifier according to the second message, where the second message includes the line identifier, obtaining a first identifier according to the line identifier, obtaining a first message according to the first identifier and the second message, where the first message includes the first identifier and the second message, and sending the first message to an access controller using the communications interface.

Optionally, the processor may further perform the method provided according to any one of the second aspect or the possible implementations of the second aspect.

According to a seventh aspect, an access system is provided. The access system includes the foregoing access controller and the foregoing access apparatus. The access controller is the access controller provided according to any one of the third aspect or the possible implementations of the third aspect, or the access controller provided according to any one of the fifth aspect or the possible implementations of the fifth aspect. The access apparatus may be the access apparatus provided according to any one of the fourth aspect or the possible implementations of the fourth aspect, or the access apparatus provided according to any one of the sixth aspect or the possible implementations of the sixth aspect.

DESCRIPTION OF EMBODIMENTS

For clarity of the embodiments of the present disclosure, a network architecture applicable to the embodiments of the present disclosure, and a line identifier, a tunnel identifier, a correspondence, and the like that are related to the embodiments of the present disclosure are described in detail first.

Figure 1:
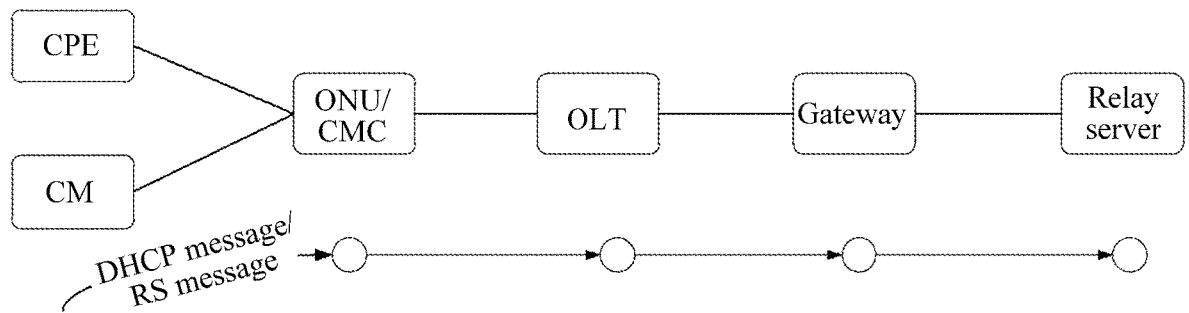
FIG. 1 is a schematic diagram of an access network.
Figure 2:
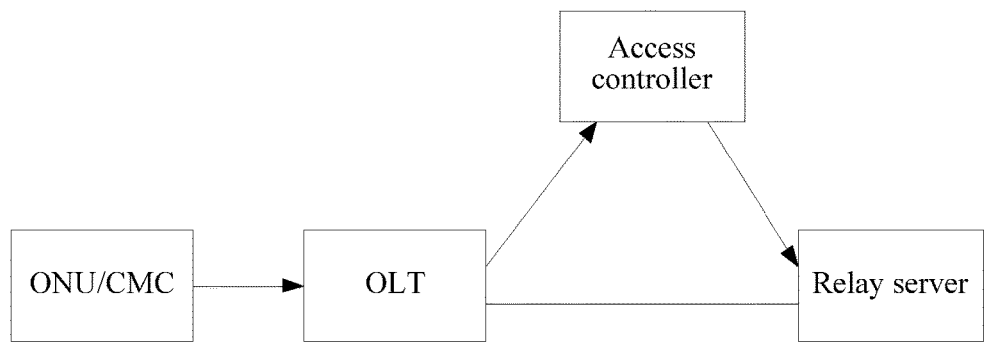
FIG. 2 is a schematic diagram of an access network according to an embodiment of the present disclosure.

In a conventional access network architecture, an access node has a complete control plane and forwarding plane. In a message transmission process, the control plane processes a message to insert an option 82, and the forwarding plane forwards the message. As shown in FIG. 1, using a passive optical network (PON) architecture as an example, a message is transmitted between a customer premises equipment (CPE) or a cable modem (CM) and a relay server using a message transmission path. The message may be a DHCP message, an RS message, or an RA message. Each access node, for example, an optical network unit (ONU), a wired cable media converter (CMC), an optical line terminal (OLT), a gateway, or a relay server that is included on the message transmission path needs to support a relay function. A control plane of each access node processes a received message, and a data plane of each access node forwards the message that has been processed by the control plane. In a conventional access network, when new services emerge continuously, the control plane of each access node needs to be configured for each added service, resulting in relatively high operation and maintenance costs and complexity. To resolve the foregoing problem, in the embodiments of the present disclosure, a software-defined networking (SDN) technology is introduced to an access network architecture. That is, an access controller is disposed in an access network, as shown in FIG. 2. A control plane of an access node is separated from a data plane, and functions of the control plane of the access node are integrated into the access controller. The access controller processes a message, for example, a control plane message.

As shown in FIG. 2, in the access network provided in the embodiments of the present disclosure, the access controller is added between an OLT and a relay server. A control plane of each access node, for example, an ONU, a CMC, or the OLT, is separated from a forwarding plane, and a function such as a DHCP message processing function, an RS message processing function, or an RA message processing function of the control plane of each access node is moved to the access controller. Each access node does not need to support a control plane function. The access controller may be an independent device, or may be built in the OLT.

The line identifier in the embodiments of the present disclosure may also be referred to as a circuit identifier or an access loop identifier (ALI).

Further, the access node is a network node on a digital subscriber line (DSL)/Ethernet. When the access node is on an asynchronous transfer mode (ATM) DSL, a format of the line identifier includes Access-Node-Identifier atm slot/port: vpi.vci. When the access node is on an Ethernet DSL/Ethernet line, a format of the line identifier includes Access-Node-Identifier eth slot/port [:vlan-id]. Access-Node-Identifier is an identifier of the access node such as a DSL access multiplexer (DSLAM). slot/port is one of or any combination of a chassis number, a rack number, a frame number, a slot number, a sub-slot number, or a port number of the access node. vpi is a VPI. vci is a VCI. "[ ]" in the format indicates that :vlan-id is optional. :vlan-id is a VID. A virtual path may be a virtual path on the DSL, and a virtual channel may be a virtual path on the DSL.

In a PON system, the line identifier includes line identifier information of an ONU part and line identifier information of an OLT part. When the ONU is on the ATM DSL, the format of the line identifier includes Access-Node-Identifier atm slot1/port1/ONUID/slot2/port2:vpi.vci. When the ONU is on the Ethernet DSL/Ethernet line, the format of the line identifier includes Access-Node-Identifier eth slot1/port1/ONUID/slot2/port2[:vlan-id]. Access-Node-Identifier is an identifier of the OLT. slot1/port1 is one of or any combination of a chassis number, a rack number, a frame number, a slot number, a sub-slot number, or a port number of the OLT. slot2/port2 is one of or any combination of a chassis number, a rack number, a frame number, a slot number, a sub-slot number, or a port number of the ONU. ONUID/slot2/port2: vpi.vci is the line identifier information of the ONU part, and Access-Node-Identifier slot1/port1 is the line identifier information of the OLT part.

In the embodiments of the present disclosure, a first identifier includes at least one of a physical port number, a tunnel identifier, a MAC address of an access node, an IP address of the access node, or a tunnel identifier of the access node. The physical port number may be a preset value having a correspondence with first sub-information, or may be a value obtained after calculation is performed according to the first sub-information. The first sub-information includes at least one of a rack number, a frame number, a slot number, a sub-slot number, or a physical port number of the access node. The tunnel identifier may be a preset value having a correspondence with second sub-information, or may be a value obtained after calculation is performed according to the second sub-information. The second sub-information includes at least one of a VID, a VPI, or a VCI of the access node.

Further, the access node and the access controller may be connected using a tunnel such as a VLAN tunnel, a virtual extensible local area network (VXLAN) tunnel, or a multi-protocol label switching (MPLS) tunnel. Correspondingly, the tunnel identifier may be an identifier of a tunnel. For example, the tunnel identifier may be a VLAN identifier, a VXLAN identifier or an MPLS label. In the embodiments of the present disclosure, a message such as a DHCP message, an RS message, or an RA message may be transmitted between the access node and the access controller using a tunnel. Alternatively, an OpenFlow message may be transmitted between the access node and the access controller using a tunnel, and the OpenFlow message may carry a tunnel identifier and a message such as a DHCP message, an RS message, or an RA message.

In the embodiments of the present disclosure, the correspondence includes a correspondence between the first identifier and the line identifier, and the correspondence may be a mapping relationship table or an encoding relationship table.

If the first identifier includes at least one of the tunnel identifier or a logical port number, and the line identifier includes the second sub-information, the correspondence may be a correspondence shown in Table 1 or Table 2. The correspondence in Table 1 is a correspondence between the tunnel identifier and the second sub-information or a correspondence between the logical port number and the second sub-information. The correspondence in Table 2 is a correspondence between the tunnel identifier, the logical port number, and the second sub-information. If a tunnel is established between the access node and the access controller, the tunnel identifier is an identifier of the tunnel between the access node and the access controller or the tunnel identifier included in the OpenFlow message. If no tunnel is established between the access node and the access controller, the tunnel identifier may be the tunnel identifier included in the OpenFlow message.

If the first identifier includes the logical port number, and the line identifier includes the first sub-information, the correspondence may be a correspondence shown in Table 3. The correspondence in Table 3 is a correspondence between the physical port number and the first sub-information. The physical port number is used to identify a physical port on a user side on the access node, that is, a physical port that is on the access node and that is used for communication with a user.

If the first identifier includes the MAC address of the access node, and the line identifier includes third sub-information, the correspondence may be a correspondence shown in Table 4. The third sub-information includes at least one of an identity or the chassis number of the access node. The correspondence in Table 4 is a correspondence between the third sub-information and the MAC address of the access node.

If the first identifier includes the IP address of the access node, and the line identifier includes the third sub-information, the correspondence may be a correspondence shown in Table 5. The correspondence in Table 5 is a correspondence between the third sub-information and the IP address of the access node.

If the first identifier includes the tunnel identifier, and the line identifier includes at least one of the rack number, the frame number, the slot number, the physical port number, the VID, the VPI, the VCI, or an identity of the access node, the correspondence includes a correspondence between the tunnel identifier and the line identifier.

TABLE 1

| Tunnel identifier or logical port number | At least one of a customer VLAN ID (C-VID), a service VLAN ID (S-VID), a VID of a U interface, a VPI, or a VCI |
|---|---|

TABLE 2

| Tunnel identifier and logical port number | At least one of a C-VID, an S-VID, a VID of a U interface, a VPI, or a VCI |
|---|---|

TABLE 3

| Physical port | Rack, Frame, Slot, Port |
|---|---|

TABLE 4

| MAC address | access node identifier, chassis identifier or ONU identifier |
|---|---|

TABLE 5

| IP address | access node identifier, chassis identifier or ONU identifier |
|---|---|

The access controller in the embodiments of the present disclosure may obtain the first identifier or the line identifier according to the foregoing Table 1 to Table 5. Further, the access controller may query one or more tables of the foregoing Table 1 to Table 5 according to the obtained first identifier to obtain the line identifier. Alternatively, the access controller may query one or more tables of the foregoing Table 1 to Table 5 according to the obtained line identifier to obtain the first identifier.

Optionally, the correspondence in the embodiments of the present disclosure may include one or more tables of Table 1, Table 2, Table 3, Table 4, and Table 5. Correspondingly, the line identifier may include one or more pieces of information of the first sub-information, the second sub-information, or the third sub-information. No specific examples are provided herein.

Figure 3:
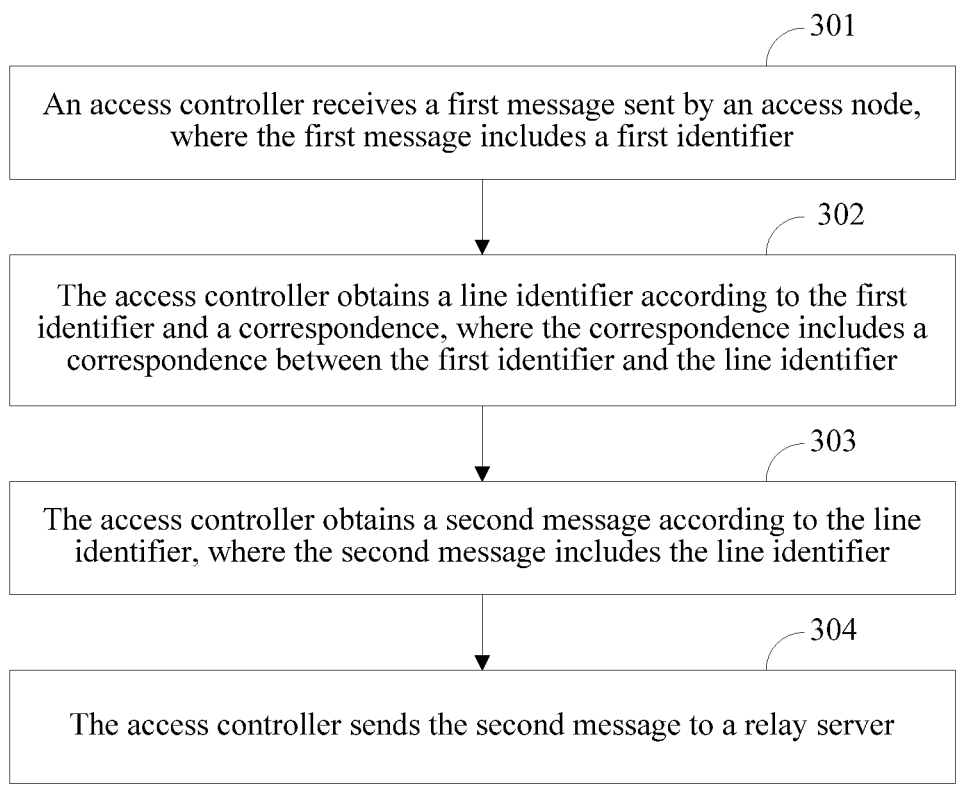
FIG. 3 is a flowchart of Embodiment 1 of a message transmission method according to the present disclosure.

FIG. 3 is a flowchart of Embodiment 1 of a message transmission method according to the present disclosure. This embodiment is performed by an access controller. The method provided in this embodiment is a method for transmitting an uplink message. The uplink message is a message that is sent by an access node to the access controller. Further, the method provided in Embodiment 1 includes the following steps.

Step 301: The access controller receives a first message sent by the access node, where the first message includes a first identifier.

For example, the first message may be an OpenFlow message or a tunnel message. The first message may further include a DHCP message, an Extensible Authentication Protocol (EAP) message, or an RS message from a user. A tunnel may be a VLAN tunnel, a VXLAN tunnel, or an MPLS tunnel.

Step 302: The access controller obtains a line identifier according to the first identifier and a correspondence, where the correspondence includes a correspondence between the first identifier and the line identifier.

For example, the access controller may prestore the correspondence between the first identifier and the line identifier. The access controller queries the correspondence using the first identifier to obtain the line identifier.

Optionally, step 302 may be replaced with following. The access controller encodes the first identifier according to an encoding rule to obtain a line identifier. The encoding rule may be an encoding method for encoding the first identifier into the line identifier, or the encoding rule may be an index value that corresponds to an encoding method for encoding the first identifier into the line identifier.

Step 303: The access controller obtains a second message according to the line identifier, where the second message includes the line identifier.

For example, if the first message further includes a first DHCP message, and the second message is a second DHCP message, obtaining, by the access controller, a second message according to the line identifier includes adding, by the access controller, the line identifier to the first DHCP message to obtain the second DHCP message, where the second DHCP message includes the line identifier.

If the first message further includes an RS message, and the second message is a first AAA message, obtaining, by the access controller, a second message according to the line identifier includes generating, by the access controller, the first AAA message according to the line identifier and the RS message, where the first AAA message includes the line identifier.

If the first message further includes a third DHCP message, and the second message is a second AAA message, obtaining, by the access controller, a second message according to the line identifier includes obtaining, by the access controller, the second AAA message according to the line identifier and the third DHCP message, where the second AAA message includes the line identifier. The second AAA message further includes data and/or information included in the third DHCP message.

Step 304: The access controller sends the second message to a relay server.

For example, the relay server is a DHCP server, or an AAA server having an IP address assignment function.

In the message transmission method provided in this embodiment of the present disclosure, after receiving the first message sent by the access node, the access controller determines the line identifier according to the first identifier included in the first message, then adds the line identifier to the first message to obtain the second message, and sends the second message to the relay server. In the process, the access node forwards the first message to the access controller, and the access controller inserts a line identifier into the first message such that the access node does not need to support a relay function, and an option 82 of the access node does not need to be maintained, reducing maintenance for and maintenance complexity of the option 82 of the access node. In addition, the access controller may determine the line identifier according to the first identifier included in the first message such that the access controller determines a line identifier in a process of receiving an uplink message.

Figure 4:
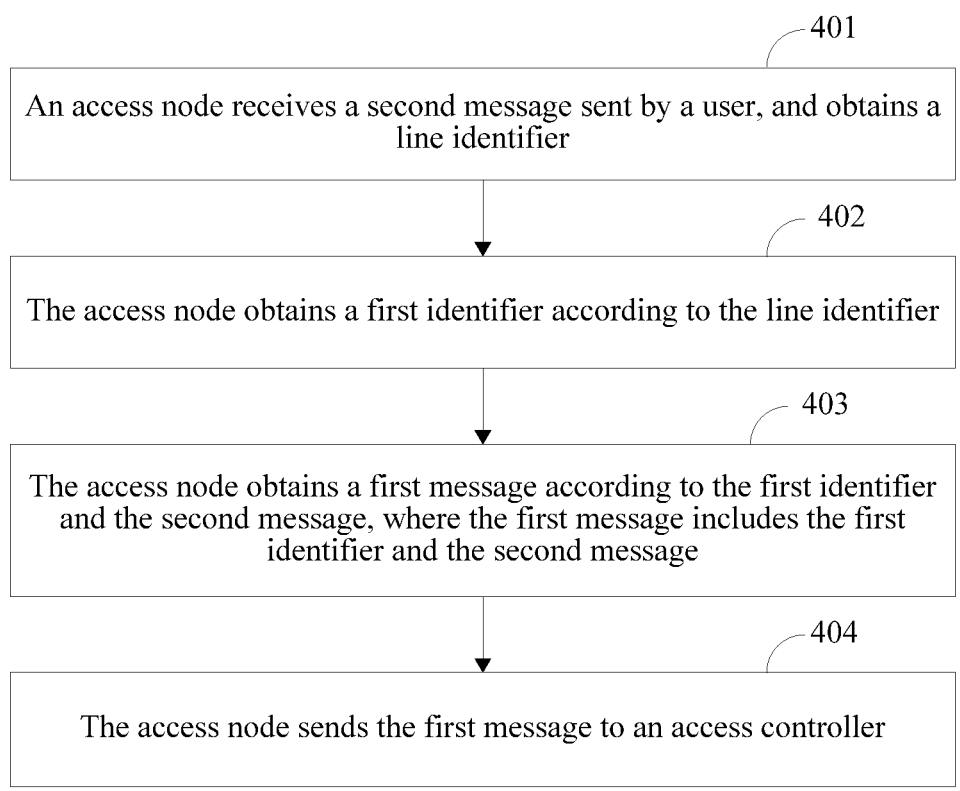
FIG. 4 is a flowchart of Embodiment 2 of a message transmission method according to the present disclosure.

FIG. 4 is a flowchart of Embodiment 2 of a message transmission method according to the present disclosure. This embodiment is performed by an access node. The method provided in this embodiment is a method for transmitting an uplink message. The uplink message is a message that is sent by the access node to an access controller. The method provided in Embodiment 2 includes the following steps.

Step 401: The access node receives a second message sent by a user, and obtains a line identifier.

For example, the second message may be from a client device or a CM used by the user. The access node may determine the line identifier according to a port at which the second message is received. For a specific method, details are not described herein.

Step 402: The access node obtains a first identifier according to the line identifier.

For example, the access node may store a correspondence between the line identifier and the first identifier. The access node queries the correspondence using the line identifier to obtain the first identifier.

Optionally, step 402 may be replaced with the following. The access node encodes the line identifier according to an encoding rule to obtain a first identifier. The encoding rule may be an encoding method for encoding the line identifier into the first identifier, or the encoding rule may be an index value that corresponds to an encoding method for encoding the line identifier into the first identifier.

Step 403: The access node obtains a first message according to the first identifier and the second message, where the first message includes the first identifier and the second message.

The first message is an OpenFlow message or a tunnel packet. The first message does not include the line identifier.

Step 404: The access node sends the first message to the access controller.

In the message transmission method provided in this embodiment of the present disclosure, the access node sends the first message including the second message and the first identifier to the access controller. The access node may not need to support a relay function, for example, not need to maintain an option 82. This helps reduce maintenance complexity.

Figure 5:
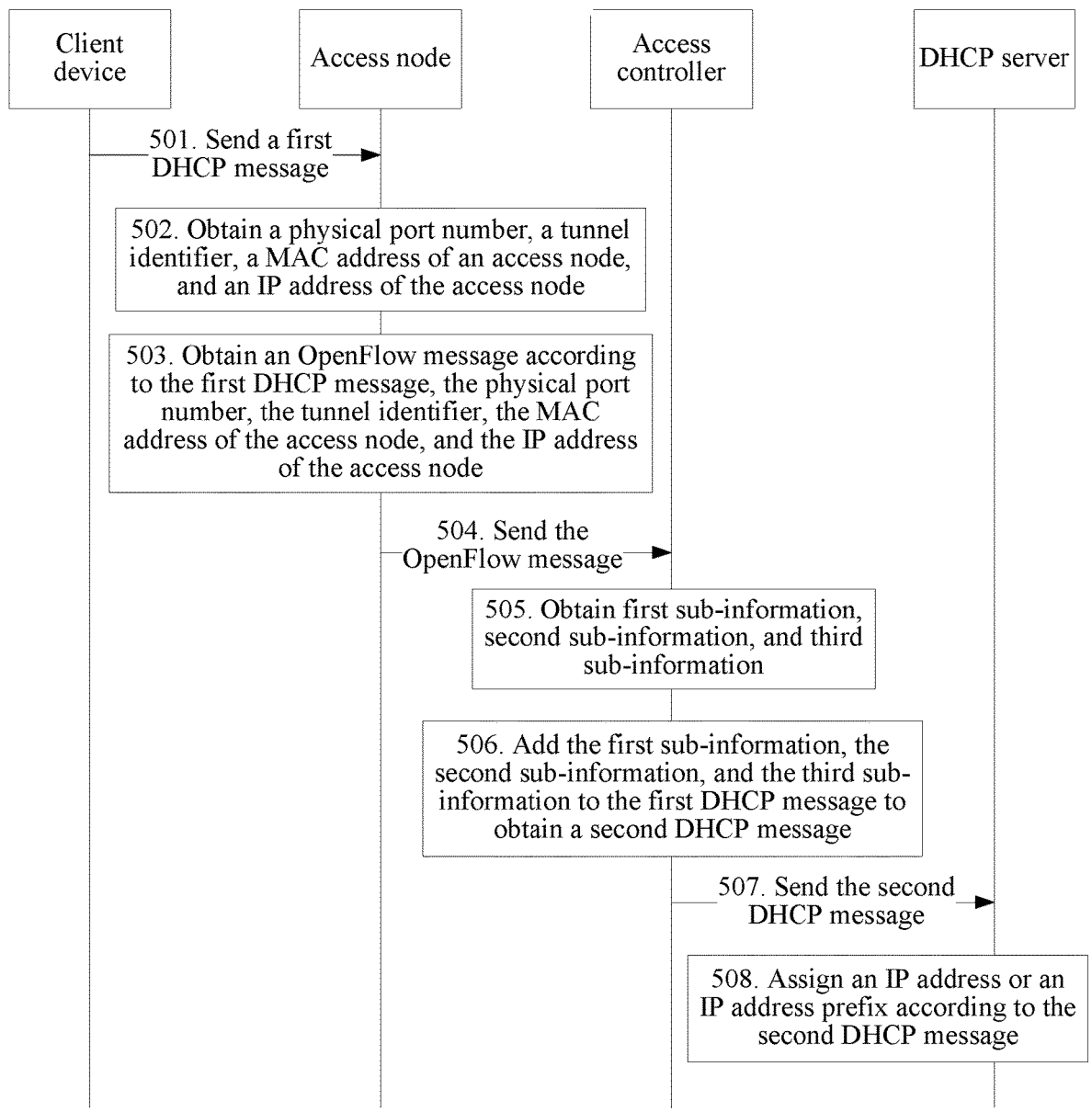
FIG. 5 is a signaling diagram of Embodiment 3 of a message transmission method according to the present disclosure.

FIG. 5 is a signaling diagram of Embodiment 3 of a message transmission method according to the present disclosure. In this embodiment, a relay server is a DHCP server, and a first message that is sent by an access node to an access controller is an OpenFlow message. The method provided in Embodiment 3 includes the following steps.

Step 501: The access node receives a first DHCP message sent by a client device.

The access node obtains a line identifier using a line on which the first DHCP message is received. The line identifier includes first sub-information, second sub-information, and third sub-information.

Step 502: The access node obtains a physical port number, a tunnel identifier, a MAC address of the access node, and an IP address of the access node.

The access node stores a correspondence. The correspondence may be one or more of the correspondences shown in the foregoing Table 1 to Table 5. The correspondence in Embodiment 3 includes the correspondences shown in Table 1 to Table 5. The present disclosure is not limited thereto. In another feasible implementation, only some entries in Table 1 to Table 5 may be set.

For example, the access node obtaining the first identifier includes that the access node obtains the line identifier using the line on which the first DHCP message is received, and the access node obtains the physical port number, the tunnel identifier, the MAC address of the access node, and the IP address of the access node according to the correspondence, the first sub-information, the second sub-information, and the third sub-information.

Optionally, the access node may obtain the first identifier according to an encoding rule and the line identifier, and no other examples are used herein for description.

Step 503: The access node obtains an OpenFlow message according to the first DHCP message, the physical port number, the tunnel identifier, the MAC address of the access node, and the IP address of the access node.

The OpenFlow message includes the first DHCP message, the physical port number, the tunnel identifier, the MAC address of the access node, and the IP address of the access node. If the access node and the access controller are connected using a tunnel, the access node may further perform tunnel encapsulation on the OpenFlow message, and sends the OpenFlow message on which tunnel encapsulation has been performed to the access controller.

Step 504: The access node sends the OpenFlow message to the access controller.

Step 505: The access controller obtains first sub-information, second sub-information, and third sub-information.

The access controller may store the correspondence. The correspondence stored in the access controller is the same as the correspondence stored in the access node.

For example, the access controller may query the correspondence using the physical port number, the tunnel identifier, the MAC address of the access node, and the IP address of the access node to obtain the first sub-information, the second sub-information, and the third sub-information.

Step 506: The access controller adds the first sub-information, the second sub-information, and the third sub-information to the first DHCP message to obtain a second DHCP message.

The second DHCP message includes the first sub-information, the second sub-information, and the third sub-information.

Step 507: The access controller sends the second DHCP message to the DHCP server.

Step 508: The DHCP server assigns an IP address or an IP address prefix according to the second DHCP message.

Figure 6:
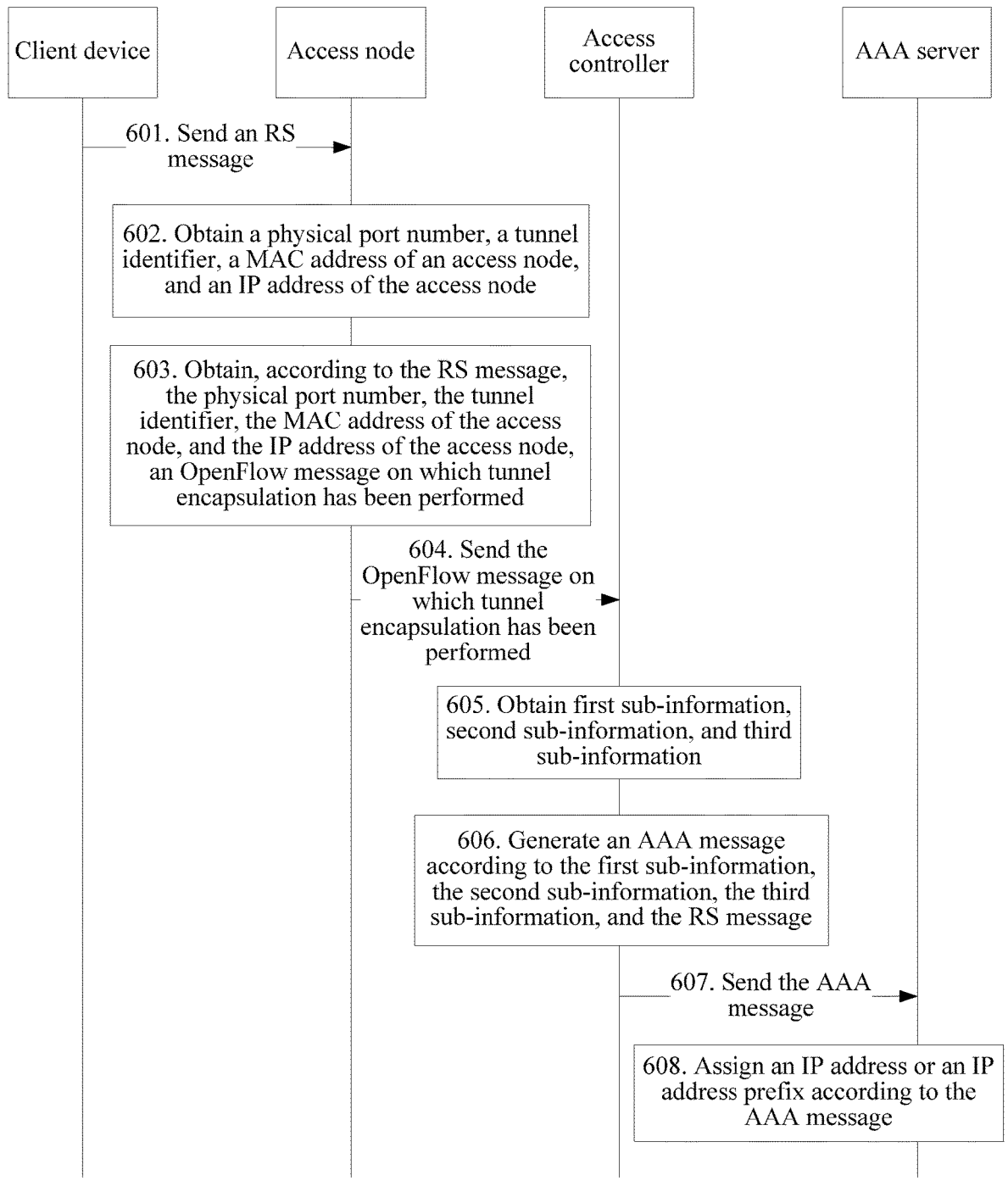
FIG. 6 is a signaling diagram of Embodiment 4 of a message transmission method according to the present disclosure.

FIG. 6 is a signaling diagram of Embodiment 4 of a message transmission method according to the present disclosure. In this embodiment, a relay server is an AAA server, and a first message that is sent by an access node to an access controller is an OpenFlow message on which tunnel encapsulation has been performed. The method provided in Embodiment 4 includes the following steps.

Step 601: The access node receives an RS message sent by a client device.

The access node obtains a line identifier using a line on which the RS message is received. The line identifier includes first sub-information, second sub-information, and third sub-information.

Step 602: The access node obtains a physical port number, a tunnel identifier, a MAC address of the access node, and an IP address of the access node.

The access node stores a correspondence. The correspondence may be one or more of the correspondences shown in the foregoing Table 1 to Table 5. The correspondence in Embodiment 3 includes the correspondences shown in Table 1 to Table 5. The present disclosure is not limited thereto. In another feasible implementation, only some entries in Table 1 to Table 5 may be set.

For example, the access node obtains a first identifier includes that the access node obtains the line identifier using the line on which the RS message is received, and the access node obtains the physical port number, the tunnel identifier, the MAC address of the access node, and the IP address of the access node according to the correspondence, the first sub-information, the second sub-information, and the third sub-information.

Optionally, the access node may obtain the first identifier according to an encoding rule and the line identifier, and no other examples are used herein for description.

Step 603: The access node obtains, according to the RS message, the physical port number, the tunnel identifier, the MAC address of the access node, and the IP address of the access node, an OpenFlow message on which tunnel encapsulation has been performed.

The OpenFlow message includes the RS message, the physical port number, the tunnel identifier, the MAC address of the access node, and the IP address of the access node. The access node performs tunnel encapsulation on the OpenFlow message, to obtain the OpenFlow message on which tunnel encapsulation has been performed.

Step 604: The access node sends the OpenFlow message on which tunnel encapsulation has been performed to the access controller.

Step 605: The access controller obtains first sub-information, second sub-information, and third sub-information.

The access controller may store the correspondence. The correspondence stored in the access controller is the same as the correspondence stored in the access node.

For example, the access controller may query the correspondence using the physical port number, the tunnel identifier, the MAC address of the access node, and the IP address of the access node to obtain the first sub-information, the second sub-information, and the third sub-information.

Step 606: The access controller generates an AAA message according to the first sub-information, the second sub-information, the third sub-information, and the RS message.

The AAA message includes the first sub-information, the second sub-information, and the third sub-information.

Step 607: The access controller sends the AAA message to the AAA server.

Step 608: The AAA server assigns an IP address or an IP address prefix according to the AAA message.

Optionally, the RS message in steps 601 to 608 may be replaced with a DHCP message. An embodiment of the DHCP message after replacement is not described in detail herein.

Figure 7:
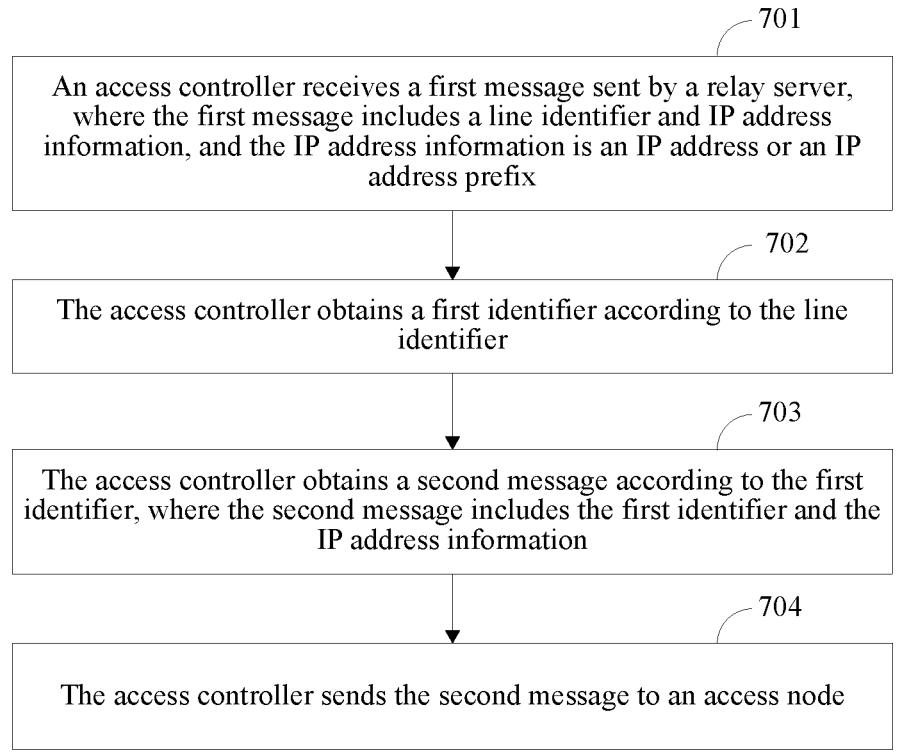
FIG. 7 is a flowchart of Embodiment 5 of a message transmission method according to the present disclosure.

FIG. 7 is a flowchart of Embodiment 5 of a message transmission method according to the present disclosure. This embodiment is performed by an access controller. The method provided in this embodiment is a method for transmitting a downlink message. The downlink message is a message that is sent by the access controller to an access node. The method provided in Embodiment 5 includes the following steps.

Step 701: The access controller receives a first message sent by a relay server, where the first message includes a line identifier and IP address information, and the IP address information is an IP address or an IP address prefix.

The IP address information is IP address information assigned by the relay server.

Step 702: The access controller obtains a first identifier according to the line identifier.

For example, the access controller may prestore a correspondence between the first identifier and the line identifier.

The access controller queries the correspondence using the line identifier to obtain the first identifier.

Optionally, the access controller encodes the line identifier according to an encoding rule to obtain the first identifier. The encoding rule used by the access controller is the same as the encoding rule in Embodiment 2.

Step 703: The access controller obtains a second message according to the first identifier, where the second message includes the first identifier and the IP address information.

The second message does not include the line identifier.

For example, the first message is a first DHCP message, and obtaining, by the access controller, a second message according to the first identifier includes deleting, by the access controller, the line identifier included in the first DHCP message to obtain a second DHCP message, where the second DHCP message includes the IP address information, and obtaining, by the access controller, the second message according to the first identifier and the second DHCP message, where the second message further includes the second DHCP message.

Alternatively, the first message is an AAA message, and obtaining, by the access controller, a second message according to the first identifier includes obtaining, by the access controller, an RA message according to the AAA message and the IP address information, where the RA message includes the IP address information, and obtaining, by the access controller, the second message according to the first identifier and the RA message, where the second message further includes the RA message.

The second message is an OpenFlow message or an OpenFlow message on which tunnel encapsulation has been performed.

Step 704: The access controller sends the second message to the access node.

In the message transmission method provided in this embodiment of the present disclosure, in a process in which the access controller sends the downlink message to the access node, the access controller determines the first identifier according to the line identifier, then removes the line identifier from the first message, and obtains the second message according to the first identifier and the first message from which the line identifier is removed. In this way, the access node does not need to support a relay function, helping reduce maintenance complexity.

Figure 8:
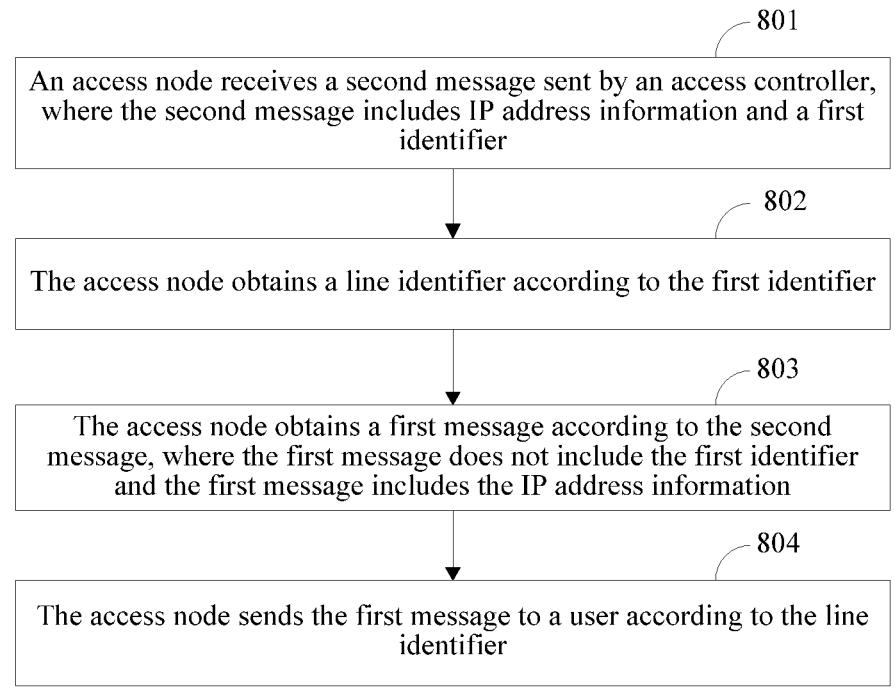
FIG. 8 is a flowchart of Embodiment 6 of a message transmission method according to the present disclosure.

FIG. 8 is a flowchart of Embodiment 6 of a message transmission method according to the present disclosure. This embodiment is performed by an access node. The method provided in this embodiment is a method for transmitting a downlink message. The downlink message is a message that is sent by an access controller to the access node. The method provided in Embodiment 6 includes the following steps.

Step 801: The access node receives a second message sent by the access controller, where the second message includes IP address information and a first identifier.

The IP address information is IP address information assigned to a user. The second message further includes an RA message or a DHCP message, and the RA message and the DHCP message do not include a line identifier and the first identifier. If a relay server is a DHCP server, the second message further includes the DHCP message. If a relay server is an AAA server, the second message further includes the RA message or the DHCP message.

Step 802: The access node obtains a line identifier according to the first identifier.

For example, the access node may store a correspondence. The correspondence may be one or more of the correspondences shown in Table 1 to Table 5.

For example, the access node queries the correspondence using the first identifier to obtain the line identifier.

Optionally, the access node encodes the first identifier according to an encoding rule to obtain the line identifier. The encoding rule used by the access node may be the same as the encoding rule used in Embodiment 1.

Step 803: The access node obtains a first message according to the second message, where the first message does not include the first identifier and the first message includes the IP address information.

The first message may be an RA message or a DHCP message that does not include the line identifier and the first identifier.

Step 804: The access node sends the first message to a user according to the line identifier.

In the message transmission method provided in this embodiment of the present disclosure, the access node determines the line identifier according to the first identifier included in the second message, and sends the first message that does not include the first identifier to a user according to the line identifier. In this way, the access node does not need to support a relay function, helping reduce maintenance complexity.

Figure 9:
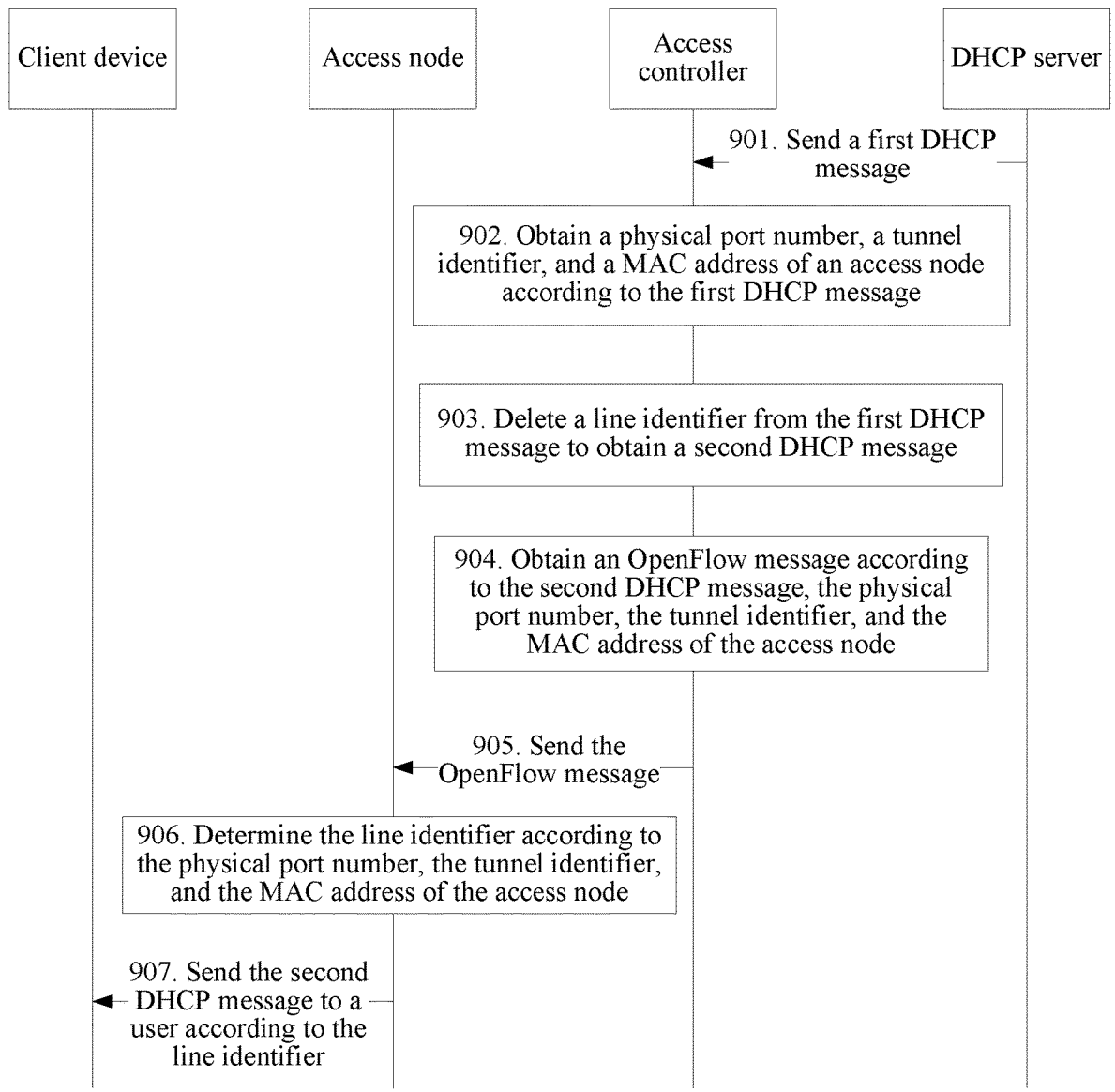
FIG. 9 is a signaling diagram of Embodiment 7 of a message transmission method according to the present disclosure.

FIG. 9 is a signaling diagram of Embodiment 7 of a message transmission method according to the present disclosure. In this embodiment, a relay server is a DHCP server, and an access controller sends an OpenFlow message to an access node. The method provided in Embodiment 7 includes the following steps.

Step 901: The access controller receives a first DHCP message sent by the DHCP server.

The first DHCP message includes a line identifier and IP address information. The IP address information is an IP address or an IP address prefix that is assigned by the DHCP server to a user. The line identifier includes first sub-information, second sub-information, and third sub-information.

Step 902: The access controller obtains a physical port number, a tunnel identifier, and a MAC address of the access node according to the first DHCP message.

The access controller stores a correspondence. The correspondence may be one or more of the correspondences shown in the foregoing Table 1 to Table 5. The correspondence in Embodiment 3 includes the correspondences shown in Table 1 to Table 5. The present disclosure is not limited thereto. In another feasible implementation, only some entries in Table 1 to Table 5 may be set.

For example, that the access controller obtains a first identifier includes the access controller queries the correspondence using the first sub-information, the second sub-information, and the third sub-information that are included in the received first DHCP message to obtain the physical port number, the tunnel identifier, and the MAC address of the access node.

Step 903: The access controller deletes a line identifier from the first DHCP message to obtain a second DHCP message.

The second DHCP message does not include the first sub-information, the second sub-information, and the third sub-information.

Step 904: The access controller obtains an OpenFlow message according to the second DHCP message, the physical port number, the tunnel identifier, and the MAC address of the access node.

The OpenFlow message includes the second DHCP message, the physical port number, the tunnel identifier, and the MAC address of the access node.

Step 905: The access controller sends the OpenFlow message to the access node.

Step 906: The access node determines the line identifier according to the physical port number, the tunnel identifier, and the MAC address of the access node.

A correspondence stored in the access node is the same as the correspondence stored in the access controller. The access node obtains the first sub-information, the second sub-information, and the third sub-information according to the correspondence, the physical port number, the tunnel identifier, and the MAC address of the access node.

Step 907: The access node sends the second DHCP message to a user according to the line identifier.

The second DHCP message includes the IP address information that is assigned by the DHCP server to the user.

Figure 10:
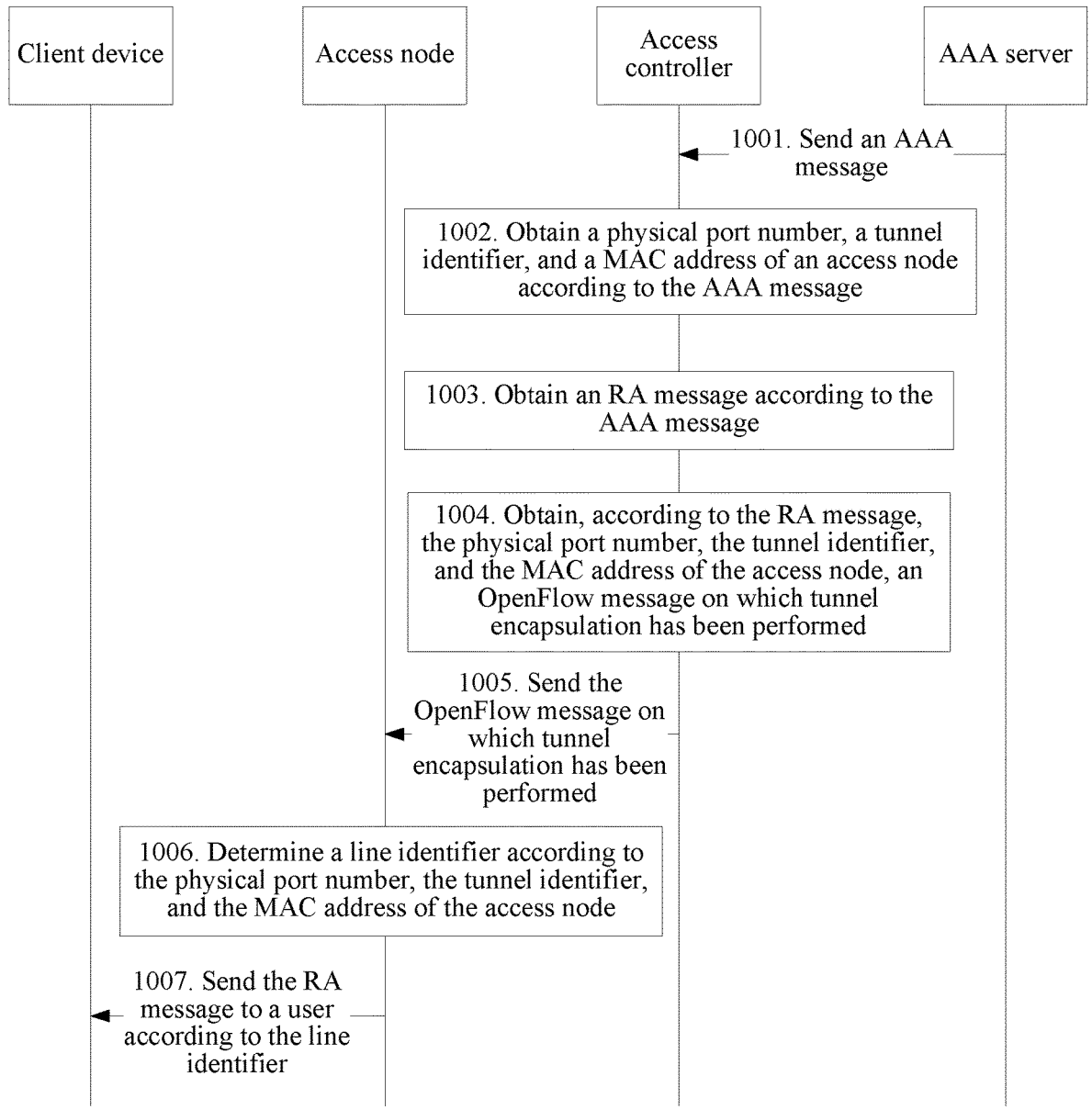
FIG. 10 is a signaling diagram of Embodiment 8 of a message transmission method according to the present disclosure.

FIG. 10 is a signaling diagram of Embodiment 8 of a message transmission method according to the present disclosure. In this embodiment, a relay server is an AAA server, and an access controller sends an OpenFlow message on which tunnel encapsulation has been performed to an access node. The method provided in Embodiment 8 includes the following steps.

Step 1001: The access controller receives an AAA message sent by the AAA server.

The AAA message includes a line identifier and IP address information. The IP address information is an IP address or an IP address prefix that is assigned by the AAA server to a user. The line identifier includes first sub-information, second sub-information, and third sub-information.

Step 1002: The access controller obtains a physical port number, a tunnel identifier, and a MAC address of the access node according to the AAA message.

The access controller stores a correspondence. The correspondence may be one or more of the correspondences shown in the foregoing Table 1 to Table 5. The correspondence in Embodiment 3 includes the correspondences shown in Table 1 to Table 5. The present disclosure is not limited thereto. In another feasible implementation, only some entries in Table 1 to Table 5 may be set.

For example, the access controller obtains a first identifier includes that the access controller queries the correspondence using the first sub-information, the second sub-information, and the third sub-information that are included in the received AAA message to obtain the physical port number, the tunnel identifier, and the MAC address of the access node.

Step 1003: The access controller obtains an RA message according to the AAA message.

The RA message does not include the first sub-information, the second sub-information, and the third sub-information. The RA message includes the IP address information that is assigned by the AAA server to the user.

Step 1004: The access controller obtains, according to the RA message, the physical port number, the tunnel identifier, and the MAC address of the access node, an OpenFlow message on which tunnel encapsulation has been performed.

The OpenFlow message includes the RA message, the physical port number, the tunnel identifier, and the MAC address of the access node. The access controller may perform tunnel encapsulation on the OpenFlow message to obtain the OpenFlow message on which tunnel encapsulation has been performed.

Step 1005: The access controller sends the OpenFlow message on which tunnel encapsulation has been performed to the access node.

Step 1006: The access node determines the line identifier according to the physical port number, the tunnel identifier, and the MAC address of the access node.

A correspondence stored in the access node is the same as the correspondence stored in the access controller. The access node obtains the first sub-information, the second sub-information, and the third sub-information according to the correspondence, the physical port number, the tunnel identifier, and the MAC address of the access node.

Step 1007: The access node sends the RA message to a user according to the line identifier.

Figure 11:
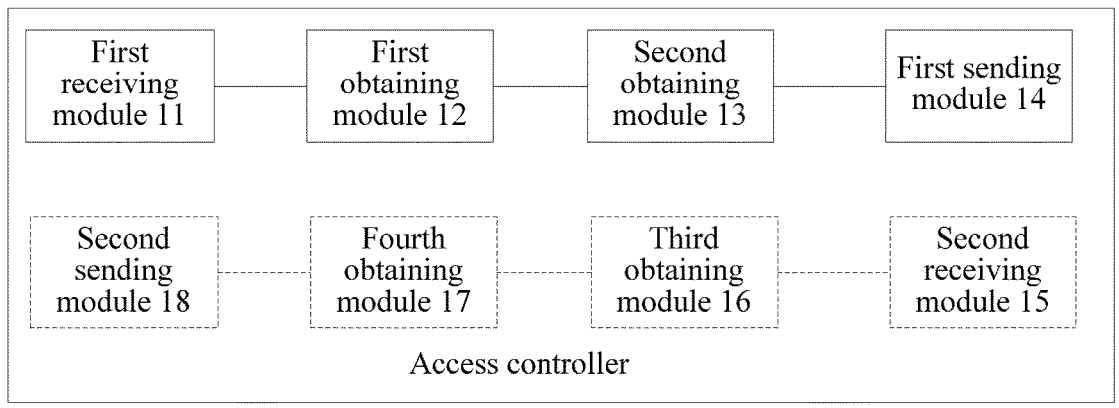
FIG. 11 is a schematic structural diagram of Embodiment 1 of an access controller according to the present disclosure.

FIG. 11 is a schematic structural diagram of Embodiment 1 of an access controller according to the present disclosure. The access controller provided in this embodiment may perform the method provided in the embodiment corresponding to FIG. 3. The access controller provided in this embodiment may be the access controller in any one of the embodiments corresponding to FIG. 5 to FIG. 10. For specific content of a message or an identifier in this embodiment, refer to corresponding content in the embodiments corresponding to FIG. 3, and FIG. 5 to FIG. 10. Details are not described herein again. The access controller provided in this embodiment includes a first receiving module 11 configured to receive a first message sent by an access node, where the first message includes a first identifier, a first obtaining module 12 configured to obtain a line identifier according to the first identifier, a second obtaining module 13 configured to obtain a second message according to the line identifier, where the second message includes the line identifier, and a first sending module 14 configured to send the second message to a relay server.

According to the access controller provided in this embodiment of the present disclosure, in a process of receiving an uplink message, after receiving the first message sent by the access node, the access controller determines the line identifier according to the first identifier included in the first message, and obtains the second message according to the line identifier. The access controller sends the second message to the relay server. In the process, the access node forwards the first message to the access controller, and the access controller adds a line identifier to the first message such that the access node does not need to support a relay function, and an option 82 of the access node does not need to be maintained, reducing maintenance for and maintenance complexity of the option 82 of the access node. In addition, the access controller may determine the line identifier according to the first identifier included in the first message such that the access controller determines the line identifier in the process of receiving the uplink message.

The first identifier is the same as the first identifier mentioned in the foregoing embodiments, and the line identifier is the same as the line identifier mentioned in the foregoing embodiments. Details are not described herein again.

For example, the first obtaining module 12 is further configured to obtain the line identifier according to the first identifier and a correspondence, where the correspondence includes a correspondence between the first identifier and the line identifier. Alternatively, the first obtaining module 12 is further configured to encode the first identifier according to a first encoding rule to obtain the line identifier.

For example, the first message further includes a first DHCP message, the second message is a second DHCP message, and the second obtaining module 13 is further configured to add the line identifier to the first DHCP message to obtain the second DHCP message, where the second DHCP message includes the line identifier.

For example, the first message further includes an RS message, the second message is a first AAA message, and the second obtaining module 13 is further configured to generate the first AAA message according to the line identifier and the RS message, where the first AAA message includes the line identifier.

Optionally, the access controller further includes a second receiving module 15 configured to receive a fourth message sent by the relay server, where the fourth message includes the line identifier and IP address information, and the IP address information is an IP address or an IP address prefix, a third obtaining module 16 configured to obtain the first identifier according to the line identifier, a fourth obtaining module 17 configured to obtain a third message according to the first identifier, where the third message includes the first identifier and the IP address information, and a second sending module 18 configured to send the third message to the access node.

For example, the third obtaining module 16 is further configured to obtain the first identifier according to the line identifier and a correspondence, where the correspondence includes the correspondence between the first identifier and the line identifier. Alternatively, the third obtaining module 16 is further configured to encode the line identifier according to a second encoding rule to obtain the first identifier.

For example, the fourth message is a third DHCP message, and the fourth obtaining module 17 is further configured to delete the line identifier included in the third DHCP message to obtain a fourth DHCP message, where the fourth DHCP message includes the IP address information, and obtain the third message according to the first identifier and the fourth DHCP message, where the third message further includes the fourth DHCP message.

For example, the fourth message is a second AAA message, and the fourth obtaining module 17 is further configured to obtain an RA message according to the second AAA message and the IP address information, where the RA message includes the IP address information, and obtain the third message according to the first identifier and the RA message, where the third message further includes the RA message.

Figure 12:
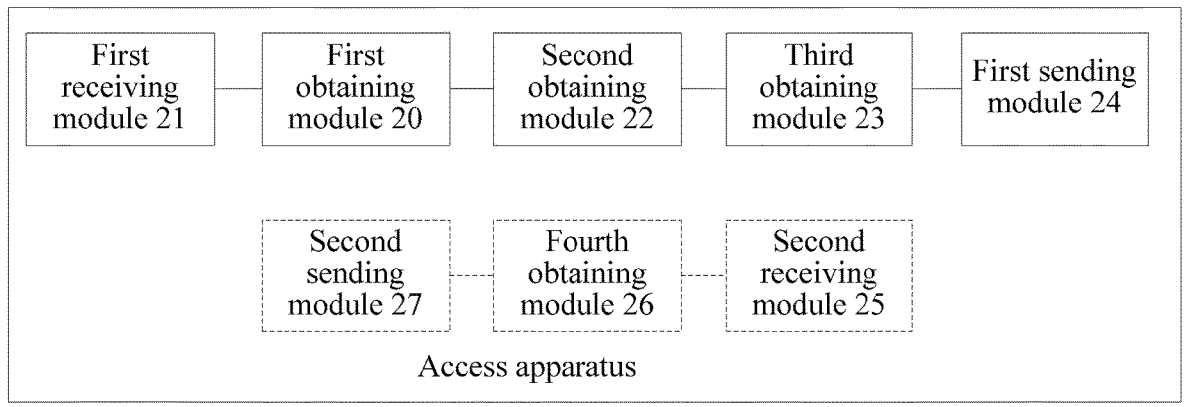
FIG. 12 is a schematic structural diagram of Embodiment 1 of an access apparatus according to the present disclosure.

FIG. 12 is a schematic structural diagram of Embodiment 1 of an access apparatus according to the present disclosure. The access apparatus provided in this embodiment may perform the method provided in the embodiment corresponding to FIG. 4. The access apparatus provided in this embodiment may be the access node in any one of the embodiments corresponding to FIG. 5 to FIG. 10. For specific content of a message or an identifier in this embodiment, refer to corresponding content in the embodiments corresponding to FIG. 4, and FIG. 5 to FIG. 10. Details are not described herein again. The access apparatus provided in this embodiment includes a first receiving module 21 configured to receive a second message sent by a user, a first obtaining module 20 configured to obtain a line identifier according to the second message, where the line identifier corresponds to the second message, and the first obtaining module 20 may obtain the line identifier according to a line on which the second message is received, a second obtaining module 22 configured to obtain a first identifier according to the line identifier, a third obtaining module 23 configured to obtain a first message according to the first identifier and the second message, where the first message includes the first identifier and the second message, and a first sending module 24 configured to send the first message to an access controller.

According to the access apparatus provided in this embodiment of the present disclosure, in a process of sending an uplink message, after receiving a second message from a client device, the access apparatus obtains a first identifier according to a line identifier corresponding to the second message. The access apparatus obtains a first message according to the first identifier and the second message. The access apparatus sends the first message to the access controller. The access apparatus does not need to support a relay function, and does not need to maintain an option 82, reducing maintenance for and maintenance complexity of the option 82 of the access node.

For example, the second obtaining module 22 is further configured to obtain the first identifier according to the line identifier and a correspondence, where the correspondence includes a correspondence between the line identifier and the first identifier. Alternatively, the second obtaining module 22 is further configured to encode the line identifier according to a first encoding rule to obtain the first identifier.

Optionally, the access apparatus further includes a second receiving module 25 configured to receive a third message sent by the access controller, where the third message includes IP address information, the first identifier, and a fourth message, the IP address information is an IP address or an IP address prefix, and the fourth message includes the IP address information, a fourth obtaining module 26 configured to obtain the line identifier according to the first identifier, and a second sending module 27 configured to send the fourth message to the user according to the line identifier.

For example, the fourth obtaining module 26 is further configured to obtain the line identifier according to the first identifier and the correspondence, where the correspondence includes the correspondence between the first identifier and the line identifier. Alternatively, the fourth obtaining module 26 is further configured to encode the first identifier according to a second encoding rule to obtain the line identifier.

Figure 13:
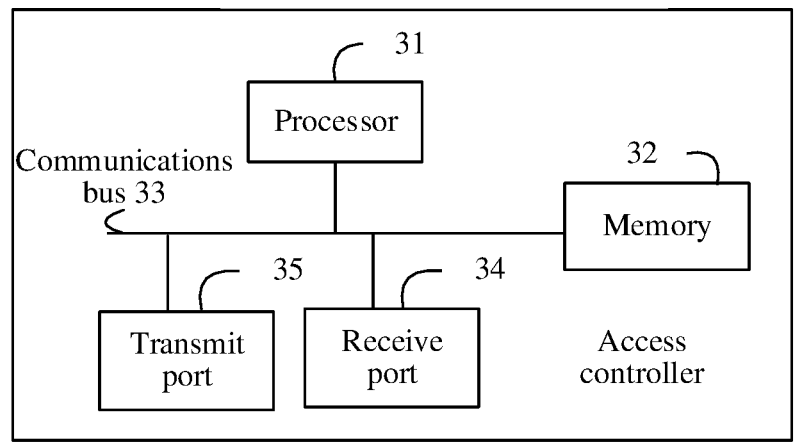
FIG. 13 is a schematic structural diagram of Embodiment 2 of an access controller according to the present disclosure.

FIG. 13 is a schematic structural diagram of Embodiment 2 of an access controller according to the present disclosure. The access controller provided in this embodiment may perform the method provided in the embodiment corresponding to FIG. 3. The access controller provided in this embodiment may be the access controller in any one of the embodiments corresponding to FIG. 5 to FIG. 11. For specific content of a message or an identifier in this embodiment, refer to corresponding content in the embodiments corresponding to FIG. 3, and FIG. 5 to FIG. 11. Details are not described herein again.

The access controller provided in this embodiment includes a communications interface (not shown), a processor 31, and a memory 32 configured to store a program. The communications interface, the processor 31, and the memory 32 are connected using a communications bus 33. The processor 31 reads the program in the memory 32, and performs, according to an instruction corresponding to the program, the operations of receiving, using the communications interface, a first message sent by an access node, where the first message includes a first identifier, obtaining a line identifier according to the first identifier, obtaining a second message according to the line identifier, where the second message includes the line identifier, and sending the second message to a relay server using the communications interface.

A communications interface having a receiving function may be a receive port 34 in FIG. 13, and a communications interface having a sending function may be a transmit port 35 in FIG. 13. The processor 31 included in the access controller may further perform the method provided in any one of the embodiments corresponding to FIG. 3, and FIG. 5 to FIG. 10. Details are not described herein again.

Figure 14:
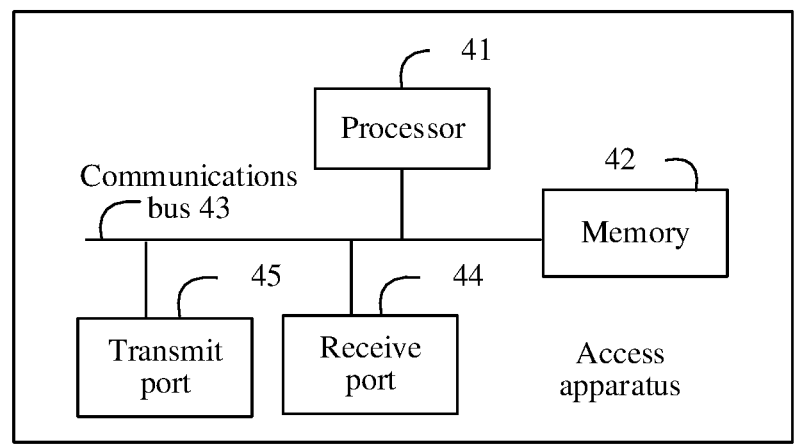
FIG. 14 is a schematic structural diagram of Embodiment 2 of an access apparatus according to the present disclosure.

FIG. 14 is a schematic structural diagram of Embodiment 2 of an access apparatus according to the present disclosure. The access apparatus provided in this embodiment may perform the method provided in the embodiment corresponding to FIG. 4. The access apparatus provided in this embodiment may be the access apparatus in any one of the embodiments corresponding to FIG. 5 to FIG. 10, and FIG. 12. For specific content of a message or an identifier in this embodiment, refer to corresponding content in the embodiments corresponding to FIG. 3, FIG. 5 to FIG. 10, and FIG. 11. Details are not described herein again.

The access apparatus provided in this embodiment includes a communications interface (not shown), a processor 41, and a memory 42 configured to store a program. The communications interface, the processor 41, and the memory 42 may be connected using a communications bus 43. The processor 41 reads the program in the memory 42, and performs, according to an instruction corresponding to the program, the operations of receiving, using the communications interface, a second message sent by a user, obtaining a line identifier according to the second message, where the second message includes the line identifier, obtaining a first identifier according to the line identifier, obtaining a first message according to the first identifier and the second message, where the first message includes the first identifier and the second message, and sending the first message to an access controller using the communications interface.

A communications interface having a receiving function may be a receive port 44 in FIG. 14, and a communications interface having a sending function may be a transmit port 45 in FIG. 14. The processor 41 included in the access apparatus may further perform the method provided in any one of the embodiments corresponding to FIG. 3, and FIG. 5 to FIG. 10. Details are not described herein again.

An embodiment of the present disclosure further provides an access system. The access system may include any access controller provided in the embodiment corresponding to FIG. 11 and any access apparatus provided in the embodiment corresponding to FIG. 12. Alternatively, the access system may include any access controller provided in the embodiment corresponding to FIG. 13 and any access apparatus provided in the embodiment corresponding to FIG. 14. Details are not described herein again.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program encode, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A message transmission method comprising:
   receiving, by an access controller, a first message from an access node, wherein the first message comprises a first Dynamic Host Configuration Protocol (DHCP) message or a first router solicitation (RS) message, wherein the first message further comprises a first identifier, and wherein neither of the first DHCP message nor the first RS message comprise the first identifier;
   obtaining, by the access controller, a line identifier according to the first identifier, wherein the line identifier comprises a physical identifier of the access node;
   generating, by the access controller, a second message according to the line identifier, wherein the second message comprises the line identifier; and
   sending, by the access controller, the second message to a network device.

2. The method of claim 1, wherein obtaining the line identifier comprises obtaining the line identifier according to a correspondence between the first identifier and the line identifier.

3. The method of claim 1, when the first message comprises the first DHCP message, the second message comprises a second DHCP message, wherein generating the second message comprises adding, by the access controller, the line identifier to the first DHCP message to obtain the second DHCP message, and wherein the second DHCP message comprises the line identifier.

4. The method of claim 1, when the first message comprises the RS message, the second message comprises a first authentication, authorization, and accounting (AAA) message, wherein the first AAA message is obtained according to the line identifier and the RS message, and wherein the first AAA message comprises the line identifier.

5. The method of claim 1, further comprising:
receiving, by the access controller, a fourth message from the network device, wherein the fourth message comprises the line identifier and Internet Protocol (IP) address information;
obtaining, by the access controller, the first identifier according to the line identifier;
generating, by the access controller, a third message according to the first identifier, wherein the third message comprises the first identifier and the IP address information; and
sending, by the access controller, the third message to the access node.

6. The method of claim 5, wherein obtaining the first identifier comprises obtaining the first identifier according to a correspondence between the first identifier and the line identifier.

7. The method of claim 5, wherein the fourth message comprises a third DHCP message, and wherein generating the third message comprises:
deleting, by the access controller, the line identifier comprised in the third DHCP message to obtain a fourth DHCP message, wherein the fourth DHCP message comprises the IP address information; and
generating, by the access controller, the third message according to the first identifier and the fourth DHCP message, wherein the third message further comprises the fourth DHCP message.

8. The method of claim 5, wherein the fourth message comprises a second authentication, authorization, and accounting (AAA) message, and wherein generating the third message comprises:
obtaining, by the access controller, a router advertisement (RA) message according to the second AAA message and the IP address information, wherein the RA message comprises the IP address information; and
generating, by the access controller, the third message according to the first identifier and the RA message, wherein the third message further comprises the RA message.

9. The method of claim 1, wherein obtaining the line identifier comprises encoding, by the access controller, the first identifier according to a first encoding rule to obtain the line identifier.

10. A message transmission method comprising:
receiving, by an access node, a second message from a user;
obtaining, by the access node, a line identifier according to the second message, wherein the second message comprises first Dynamic Host Control Protocol (DHCP) message or a first router solicitation (RS) message;
obtaining, by the access node, a first identifier according to the line identifier;
generating, by the access node, a first message according to the first identifier and the second message, wherein the first message comprises the first identifier and the second message; and
sending, by the access node, the first message to an access controller.

11. The method of claim 10, wherein obtaining the first identifier comprises encoding, by the access node, the line identifier according to a first encoding rule to obtain the first identifier.

12. The method of claim 10, further comprising:
receiving, by the access node, a third message from the access controller, wherein the third message comprises the first identifier;
receiving, by the access node, a fourth message comprising Internet Protocol (IP) address information;
obtaining, by the access node, the line identifier according to the first identifier; and
sending, by the access node, the fourth message to a user according to the line identifier.

13. The method of claim 12, wherein obtaining the line identifier according to the first identifier comprises encoding, by the access node, the first identifier according to a second encoding rule to obtain the line identifier.

14. The method of claim 10, wherein obtaining the first identifier comprises obtaining, by the access node, the first identifier according to the line identifier and a correspondence, wherein the correspondence comprises a correspondence between the line identifier and the first identifier.

15. An access controller, comprising:
a non-transitory computer-readable storage medium configured to store programming instructions; and
a processor coupled to the non-transitory computer-readable storage medium, wherein the programming instructions cause the access controller to be configured to:
receive a first message from an access node, wherein the first message comprises a first Dynamic Host Configuration Protocol (DHCP) message or a first router solicitation (RS) message, wherein the first message further comprises a first identifier, and wherein neither of the first DHCP message nor the first RS message comprise the first identifier;
obtain a line identifier according to the first identifier, wherein the line identifier comprises a physical identifier of the access node;
generate a second message according to the line identifier, wherein the second message comprises the line identifier; and
send the second message to a network device.

16. The access controller of claim 15, wherein the programming instructions cause the access controller to be configured to encode the first identifier according to a first encoding rule to obtain the line identifier.

17. The access controller of claim 15, when the first message comprises the DHCP message, the second message comprises a second DHCP message, wherein the programming instructions further cause the access controller to be configured to add the line identifier to the first DHCP message to obtain the second DHCP message, and wherein the second DHCP message comprises the line identifier.

18. The access controller of claim 15, when the first message comprises the RS message, the second message comprises a first authentication, authorization, and accounting (AAA) message, wherein the first AAA message is obtained according to the line identifier and the RS message, and wherein the first AAA message comprises the line identifier.

19. The access controller of claim 15, wherein the programming instructions further cause the access controller to be configured to:
   receive a fourth message from the network device, wherein the fourth message comprises the line identifier and Internet Protocol (IP) address information;
   obtain the first identifier according to the line identifier;
   obtain a third message according to the first identifier, wherein the third message comprises the first identifier and the IP address information; and
   send the third message to the access node.

20. The access controller of claim 19, wherein the programming instructions cause the access controller to be configured to encode the line identifier according to a second encoding rule to obtain the first identifier.

21. The access controller of claim 19, wherein the fourth message comprises a third DHCP message, and wherein the programming instructions further cause the access controller to be configured to:
   delete the line identifier comprised in the third DHCP message to obtain a fourth DHCP message, wherein the fourth DHCP message comprises the IP address information; and
   obtain the third message according to the first identifier and the fourth DHCP message, wherein the third message further comprises the fourth DHCP message.

22. The access controller of claim 19, wherein the fourth message comprises a second authentication, authorization, and accounting (AAA) message, and wherein the programming instructions further cause the access controller to be configured to:
   obtain a router advertisement (RA) message according to the second AAA message and the IP address information, wherein the RA message comprises the IP address information; and
   obtain the third message according to the first identifier and the RA message, wherein the third message further comprises the RA message.

23. The access controller of claim 15, wherein the programming instructions cause the access apparatus to be configured to obtain the line identifier according to the first identifier and a correspondence, wherein the correspondence comprises a correspondence between the first identifier and the line identifier.

24. An access apparatus comprising:
   a non-transitory computer-readable storage medium configured to store programming instructions; and
   a processor coupled to the non-transitory computer-readable storage medium, wherein the programming instructions cause the access apparatus to be configured to:
   receive a second message from a user;
   obtain a line identifier according to the second message, wherein the second message comprises a first Dynamic Host Configuration Protocol (DHCP) message or a first router solicitation (RS) message;
   obtain a first identifier according to the line identifier;
   generate a first message according to the first identifier and the second message, wherein the first message comprises the first identifier and the second message; and
   send the first message to an access controller.

25. The access apparatus of claim 24, wherein the programming instructions cause the access apparatus to he configured to obtain the first identifier according to a correspondence between the line identifier and the first identifier.

26. The access apparatus of claim 24, wherein the programming instructions further cause the access apparatus to be configured to:
   receive a third message from the access controller, wherein the third message comprises the first identifier;
   receive a fourth message comprising Internet Protocol (IP) address information;
   obtain the line identifier according to the first identifier; and
   send the fourth message to the user according to the line identifier.

27. The access apparatus of claim 26, wherein the programming instructions cause the access apparatus to be configured to obtain the line identifier according to a correspondence between the first identifier and the line identifier.

28. The access apparatus of claim 24, wherein the programming instructions cause the access apparatus to be configured to encode the line identifier according to a first encoding rule to obtain the first identifier.

* * * * *

UNITED STATES PATENT AND TRADEMARK OFFICE
CERTIFICATE OF CORRECTION

PATENT NO. : 11,178,073 B2
APPLICATION NO. : 15/873507
DATED : November 16, 2021
INVENTOR(S) : Ruobin Zheng Page 1 of 1

It is certified that error appears in the above-identified patent and that said Letters Patent is hereby corrected as shown below:

In the Claims

Claim 25, Column 26, Line 21: "apparatus to he" should read "apparatus to be"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*